United States Patent [19]
Thomas

[11] Patent Number: 5,897,896
[45] Date of Patent: Apr. 27, 1999

[54] LAYERED FOODSTUFF BINDING AGENT DISPERSIBLE IN HOT WATER AND MILK AND PREPARATION THEREOF

[75] Inventor: Remi Thomas, Berneuil En Bray, France

[73] Assignee: Nestec S.A., Vevey, Switzerland

[21] Appl. No.: 08/909,495

[22] Filed: Aug. 12, 1997

[30] Foreign Application Priority Data

Aug. 13, 1996 [EP] European Pat. Off. .............. 96202272

[51] Int. Cl.$^6$ .......................... A21D 13/00; A23L 1/216
[52] U.S. Cl. .................. 426/94; 426/96; 426/98; 426/99; 426/292; 426/303; 426/589; 426/504
[58] Field of Search ................. 426/94, 96, 98, 426/99, 292, 303, 589, 504

[56] References Cited

U.S. PATENT DOCUMENTS

| | | | |
|---|---|---|---|
| 3,007,798 | 11/1961 | Ohtaki | 99/124 |
| 3,966,993 | 6/1976 | Luck | 426/589 |
| 4,126,710 | 11/1978 | Jaworski et al. | 426/589 |
| 4,568,551 | 2/1986 | Seewi et al. | 426/99 |
| 4,687,669 | 8/1987 | Moritaka et al. | 426/72 |
| 4,704,294 | 11/1987 | Rakosky | 426/578 |
| 4,844,938 | 7/1989 | Amamoto et al. | 426/589 |
| 4,969,955 | 11/1990 | Rudin | 127/71 |
| 5,126,151 | 6/1992 | Bodor et al. | 426/99 |
| 5,145,705 | 9/1992 | Seeds | 426/589 |
| 5,208,062 | 5/1993 | Sugisawa et al. | 426/589 |
| 5,356,644 | 10/1994 | Hendrick et al. | 426/99 |
| 5,536,522 | 7/1996 | Seeds et al. | 426/589 |

FOREIGN PATENT DOCUMENTS

| | | |
|---|---|---|
| 1464429 | 2/1977 | United Kingdom . |
| 1478843 | 7/1977 | United Kingdom . |
| 9603893 | 2/1996 | WIPO . |

Primary Examiner—Nina Bhat
Attorney, Agent, or Firm—Vogt & O'Donnell, LLP

[57] ABSTRACT

Particles which provide a foodstuff binding agent which is dispersible in hot water and hot milk have a farinaceous or proteinaceous material core, an emulsifier coating layer about the core and a fat coating layer about the emulsifier layer, the emulsifier being, in particular, a phospholipid or a sucroglyceride and the fat being one which has a melting point of above 35° C. The particles are prepared by dissolving an emulsifier in an apolar lipid composition, including a liquid oil, and spraying the lipid composition containing the emulsifier onto farinaceous and/or protein particles to coat the particles and thereafter, (a) melting an edible fat and spraying the melted fat onto the coated particles to coat the emulsifier-coated particles with the fat or and then, cooling the twice-coated particles, or (b) combining a ground particulate fat with the coated particles and coating the coated particles with the fat in the solid state.

14 Claims, 1 Drawing Sheet

LAYERED FOODSTUFF BINDING AGENT DISPERSIBLE IN HOT WATER AND MILK AND PREPARATION THEREOF

BACKGROUND OF THE INVENTION

This invention relates to coated particles suitable as a binding agent for a foodstuff which is dispersible in hot water and hot milk. This invention also relates to methods for preparing said coated particles.

Binding agents form the base of many dried food products such as sauces, soups and gravies. These dried food products usually contain other ingredients such as dried vegetables, meat extracts, yeast extracts, sugars, salt, fats, oils and the like, but it is the binding agent that usually gives the food, once rehydrated, its consistency and creamy sensory appeal. The idea is for the binding agent to simulate the roux used in traditional cooking.

Like roux, the binding agents are usually prepared from a starch material and a fat. The starch material is usually in the form of a flour of some sort, particularly wheat flour, although other flours are also used. Nowadays the fat is usually a hardened vegetable fat. The starch material and the fat are combined, often dehydrated, and then added to the remaining ingredients of the dried food product. However, severe problems have arisen in providing a binding agent which, when hot water and/or hot milk is stirred into the dried food product, does not result in lumping or clumping. If the product is intended to be an "instant food", it is important that the dried food product rehydrate rapidly upon the addition of hot water without lumping or clumping.

This problem was addressed in several documents of the prior including Great Britain Complete Patent Specification No 1 478 843, which relates to a process for producing a binding agent or thickener wherein particles of a farinaceous material are first mixed with a small amount of water to form aggregates which are subsequently coated with fat. The coating step is performed by mixing in a planetary mixer or a bowl chopper or, if liquid oils are involved, by spray coating.

U.S. Pat. No. 4,568,551 refers to a process for preparing a binding agent wherein a high melting point fat is heated to melt it and this is then mixed with a starch material, particularly wheat flour, to form a homogeneous dough. A small amount of water is then mixed in. The dough is then heated to a temperature above 90° C. and maintained at the elevated temperature, under continuous mixing, until the moisture content reduces to below 7%. The dough is then cooled to room temperature and ground up to form a free-flowing, dehydrated binding agent. The binding agent is described to disperse readily in boiling water without the formation of lumps.

PCT Patent Application Publication No. WO 96/03893 describes a process for the preparation of binding agents for a foodstuff comprising a core of a farinaceous material coated with a layer of edible fat. The binding agents described therein which may be produced by a process not requiring the use of high temperatures are readily dispersible in water.

Although the binding agents of the prior art are readily dispersible in hot water, their dispersibility is not fully satisfactory in boiling milk, especially when low shear rates are used, as is the case with stirring with a spoon. In addition, in order to obtain a satisfactory dispersibility even in water, it was necessary to add high amounts of fat (>40%). When such high concentrations of fat are used, however, the thickening properties of the resulting binding agent are lowered.

SUMMARY OF THE INVENTION

It is therefore an object of this invention to provide a binding agent which readily disperses in both hot water and hot milk.

It is a further object of this invention to provide coated particles which may used as a binding agent having the properties as described above.

It is a still further object of this invention to provide methods of producing said coated particles and said binding agents.

Accordingly, in one aspect, this invention comprises coated particles each having a core of a farinaceous and/or protein material, an inner coating comprising an emulsifier and an outer coating comprising an edible fat.

In another aspect, this invention provides processes for preparing the coated particle binding agent wherein the farinaceous and/or protein particles are coated first with an emulsifier and then the coated particles are coated further with an edible fat, and the invention provides, in particular, a process which comprises dissolving an emulsifier in an apolar lipid composition, including a liquid oil, and spraying the lipid composition containing the emulsifier onto farinaceous and/or protein particles to coat the particles and thereafter, (a) melting an edible fat and spraying the melted fat onto the coated particles to coat the emulsifier-coated particles with the fat and then, cooling the twice-coated particles, or (b) combining a ground particulate fat with the coated particles and coating the coated particles with the fat in the solid state.

DETAILED DESCRIPTION OF THE INVENTION

Figure 1:
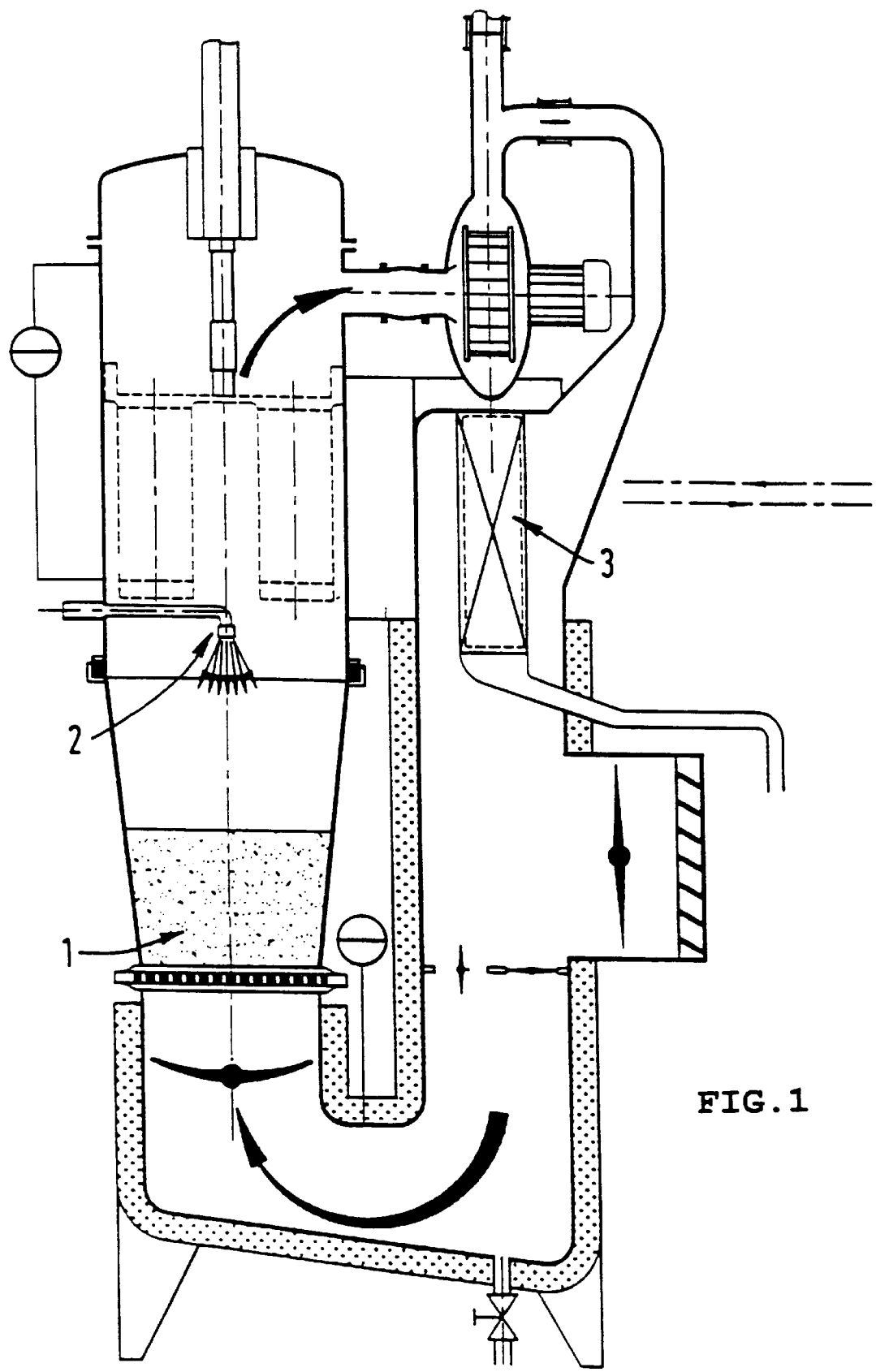

In the present invention, the farinaceous material preferably contains at least 50% by weight of a flour, particularly wheat flour. However, other flours may be used and examples are rice flour, cassava flour, tapioca flour and the like. Alternatively, agglomerated starches such as potato starch, maize starch, wheat starch and the like may be used.

The protein material preferably contains egg proteins, especially egg yolk, and/or milk protein, especially whey proteins in powder form.

Preferably, the particles of farinaceous material have a particle size of less than 500 $\mu$m, more preferably less than 300 $\mu$m. It is especially preferred that the particles of farinaceous material have a particle size in the range of from about 50 $\mu$m to about 200 $\mu$m. It is also preferred the distribution of particle sizes is relatively narrow; for example at least 60% by mass of the particles having a particle size within about 60 $\mu$m of the mean particle size.

Preferably about 70% by mass of the particles have a particle size in the range of from about 80 $\mu$m to about 150 $\mu$m with the mean particle size being at about 80 to 100 $\mu$m.

Preferably the particles of protein material have a particle size in the range of from of about 50 $\mu$m to about 200 $\mu$m.

The emulsifier which forms the inner layer of the coated particles may be any type which is suitable in food technology. However phospholipids, in particular, in a form of lecithin, especially lecithin obtained from soy beans, and/or sucroglycerides, in particular sucroglycerides obtained by transesterifying a triglyceride such as palm oil with saccharose, especially a sucroglyceride having a hydrophylic lipophilic balance (HLB) greater than 8 are preferred.

As a matter of fact especially good results were obtained with lecithin alone or in mixture with a sucroglyceride such as the product sold by the company Rhône Poulenc under the Trade Mark CELYNOL.

Before being coated onto the farinaceous and/or protein particles, the emulsifier is preferably diluted in an apolar lipid mix such as mono-, di- or triglycerides or in a liquid oil, preferably a vegetable oil, most preferably sunflower oil, soja oil and peanut oil in order to obtain a low viscosity solution. The ratio of emulsifier to apolar lipid mix/liquid oil is not important but is preferably in the range of from 1:1 to 1:6, more preferably from 1:2 to 1:4.

The amount of emulsifier is preferably in the range of from 0.8 to 5%, more preferably from 1.7 to 3.4% based on the total weight of the coated particles.

The edible fat is preferably a high melting point fat having a melting point above 35° C., for example in the range of 35° C. to 50° C. It is particularly preferred that the melting point of the fat is in the range of from 40° C. to 45° C. Hydrogenated palm oil fat is the most preferred fat. The outer fat coating makes up about 20 to 45%, more preferably about 32 to 36% by weight of the coated particles. In general, concentrations of less than 40% by weight of the coated particles are preferred in order to obtain excellent thickening qualities.

As indicated in the summary above, the invention also extends to processes for preparing the coated binding agent particles. The coating is not limited to a particular process, but basically any coating process used in food technology may be applied. The coating process involves two different coating steps, wherein the farinaceous and/or protein particles are first coated with the emulsifier and then the thus treated particles are further coated with the edible fat. Before being coated onto the farinaceous and/or protein particles, the emulsifier is preferably diluted in an apolar lipid mix as described above to obtain a low viscosity solution.

The low viscosity solution is either poured or sprayed onto the farinaceous and/or protein particles.

The second layer can be applied by any technique known in food technology, melted fat spraying and solid phase coating are however preferred. The technical equipment preferably used for the coating includes chilled drums, spraying towers, bowl choppers and paddle mixers.

In general, the solid phase coating process includes the following steps:
  a) providing the farinaceous and/or protein material;
  b) precoating said material with the emulsifier dissolved in a liquid oil; and
  c) coating the product obtained in step b) with a preground edible fat in the solid state.

In step a), the starches and flours are introduced in the bowl chopper and mixed, while the bowl chopper is kept at a low rotation speed. The precoating with the emulsifier may be obtained in two different ways, the mix of emulsifier and liquid oil is either poured or sprayed on the thus mixed farinaceous and/or protein material. For solid fat coating, fat blocks are pre-cut and preground to small pieces, preferably to a size of about 10 to 50 mm and stored at a low temperature such as, e.g., 4° C. The thus pretreated fat pieces are then introduced into the bowl chopper and the temperature of the mix is increased to 12 to 20° C., more preferably to about 14 to 18° C. The rotation speed of the bowl chopper knives is increased to a level which produces sufficient mechanical energy to melt the fat so that coating can be achieved. During the coating step, the temperature is slowly increased to ambient temperature.

The melted fat spraying process involves the following steps:

a) providing the farinaceous and/or protein particles;
  b) dissolving the emulsifier in a liquid oil;
  c) spraying the product obtained in step b) onto the farinaceous and/or protein particles;
  d) melting the edible fat and spraying it onto the product obtained in step c); and
  e) cooling the product obtained in step d).

Basically, any equipment suitable for achieving the coated particle binding agent of the present invention may be used. One example of an apparatus for producing the coated particle binding agent of the invention is an AEROMATIC machine, Type S 1, 5 (3141) which has a vat which has a volume of 0.143 m$^3$ and a vat bottom surface of 0.023 m$^2$, and an equipment arrangement and operation for producing the binding agent composition is illustrated by the accompanying drawing Figure.

BRIEF DESCRIPTION OF THE DRAWING FIGURE

The drawing FIGURE illustrates an equipment arrangement for producing the coated particle binding agent of the present invention.

DETAILED DESCRIPTION OF THE DRAWING FIGURE AND PRODUCTION OPERATION DESCRIPTION

In a first step, a farinaceous and/or protein material is introduced into the vat (1) and sufficient air is blown from below to obtain fluidization. Then, the emulsifier dissolved in liquid oil is sprayed from the spraying system (2) onto the fluidized material at room temperature. Thereafter, the melted fat, preferably hydrogenated palm oil heated to about 60° C., is sprayed on the precoated material. The heat exchanger (3) is supplied with cold water and cold air is blown on the coated material to solidify the fat. Then, the thus obtained product is stored at about 4° C.

EXAMPLES

The invention is now further illustrated by the following example.

Example 1

Solid Phase Coating

A bowl chopper of the type Alpina, 80 l capacity, equipped with 6 knives was used. A premix comprising 17 kg of wheat flour and 6 kg of potato starch was introduced to the bowl chopper and mixed for 30 s. Subsequently, a homogeneous solution comprising 0.75 kg of sunflower oil and 0.6 kg of lecithin (63% phospholipid) was poured on said premix, while the rotation speed is increased from 1000 rpm to 3000 rpm in order to achieve a good precoating. Then, 11.80 kg of preground hydrogenated palm oil which had been stored at a temperature of about 4° C. is added into the bowl chopper. The temperature is lowered to <17° C. and the rotation speed is maintained at about 3000 rpm. Rotation is continued until the temperature has risen to about 23° C. Then, the bowl chopper is emptied, and the coated particles are stored at room temperature.

Example 2

In order to demonstrate the beneficial effect of lecithin on the dispersibility, binding agents with different lecithin concentrations have been prepared and tested for their dispersing properties. In these tests, the sum of total fat content and lecithin content was kept constant at 36%.

TABLE 1

Results with wheat flour

| lecithin | oil | HPO* | dispersion temperature (° C.)** |
|---|---|---|---|
| 0 | 6 | 30.0 | 85 |
| 1.7 | 6 | 28.3 | 100 |
| 3.4 | 6 | 26.6 | 100 |

TABLE 2

Results with potato starch

| lecithin | oil | HPO* | dispersion temperature (° C.)** |
|---|---|---|---|
| 0 | 6 | 30.0 | 92 |
| 0.8 | 6 | 29.2 | 97 |
| 1.7 | 6 | 28.3 | 100 |

*hydrogenated palm oil
**the dispersion temperature of the binding agent is the highest temperature at which no lumping or clumping is observed The dispersion temperature is increased with the lecithin content. The precoating with the emulsifier appears to be necessary for obtaining the dispersibility of wheat flour or starches in boiling liquid. The total fat content necessary to obtain complete dispersibility in boiling liquid is reduced with lecithin precoating. In the absence of lecithin, at least 40% of fat are necessary to get satisfactory dispersibility in hot water. When lecithin is added, the total fat content can be kept well below 40%, and additionally, there is a much better dispersibility in hot milk.

I claim:

1. Foodstuff binding agent particles comprising a particle core of a material selected from the group consisting of a farinaceous material and a protein-containing material, a coating layer comprising an emulsifier selected from the group consisting of a phospholipid and a sucroglceride which coats the core and a further coating layer comprising a fat having melting point in range of from 35° C. to 50° C. which coats the emulsifier coating layer.

2. Foodstuff binding agent particles according to claim 1 wherein the emulsifier coating layer further comprises an edible oil.

3. Foodstuff binding agent particles according to claim 1 wherein the emulsifier comprises lecithin.

4. Foodstuff binding agent particles according to claim 1 wherein the edible fat is hydrogenated palm oil.

5. Foodstuff binding agent particles according to claim 1 wherein the farinaceous materials is selected from the group consisting of wheat flour, rice flour, casava flour, tapioca flour, potato starch, maize starch and wheat starch and wherein the protein-containing materials is selected from the group consisting of material which contains egg protein and contains milk protein and wherein the liquid edible oil is selected from the group consisting of sunflower oil, soja oil and peanut oil.

6. Foodstuff binding agent particles according to claim 1 wherein the material particles have a particle size of from 50 $\mu$m to 200 $\mu$m.

7. A process for preparing foodstuff binding agent particles comprising:

dissolving an emulsifier selected from the group consisting of a phospholipid and a sucroglyceride in a liquid edible oil to obtain an oil/emulsifier solution;

coating particles of a substance material selected from the group consisting of farinaceous material particles and protein-containing material particles with the oil/emulsifier solution to obtain first coated product particles;

melting an edible fat having a melting point in a range of from 35° C. to 50°C. to obtain a melted fat and coating the melted fat onto the first coated product particles to obtain fat-coated particles so that there are two coating layers on the material particles; and cooling the two-layered particles to obtain a two-layered binding agent particles.

8. A process for preparing foodstuff binding agent particles comprising:

dissolving an emulsifier selected from the group consisting of a phospholipid and a sucroglyceride in a liquid edible oil to obtain an oil/emulsifier solution;

coating particles of a substance selected from the group consisting of farinaceous material particles and protein-containing material particles with the oil/emulsifier solution to obtain first coated product particles; and combining particles of an edible fat having a melting point in a range of from 35° C. to 50° C. with the first coated particles to coat the fat onto the first coated product particles to obtain fat-coated particle binding agent particles wherein there are two coating layers on the material particles.

9. A process according to claim 8 wherein the edible fat particles are combined with the first coated particles in a bowl chopper.

10. A process according to claim 7 or 8 wherein the emulsifier comprises lecithin.

11. A process according to claim 7 or 8 wherein the edible fat is hydrogenated palm oil.

12. A process according to claim 7 or 8 wherein the farinaceous material is selected from the group consisting of wheat flour, rice flour, casava flour, tapioca flour, potato starch, maize starch and wheat starch and wherein the protein-containing amterial is selected from the group consisting of amterial which contains egg protein and contains milk protein and wherein the liquid edible oil is selected from the group consisting of sunflower oil, soja oil and peanut oil.

13. A process according to claim 7 or 8 wherein the material particles have a particle size of from 50 $\mu$m to 200 $\mu$m.

14. The two-layered binding agent particles of the process of claim 7 or 8.

* * * * *

UNITED STATES PATENT AND TRADEMARK OFFICE
CERTIFICATE OF CORRECTION

PATENT NO. : 5, 897, 896
DATED : April 27, 1999
INVENTOR(S) : Remi THOMAS

It is certified that error appears in the above-identified patent and that said Letters Patent is hereby corrected as shown below:

Column 2, line 48, after "preferred", insert -- that --.

Column 3, line 53, after "ways", insert -- in that --.

Column 5, line 38 (line 5 of claim 1), change "sucroglceride" to -- sucroglyceride -- (i.e., insert a "y").

Column 5, in each of lines 49 and 52 (lines 2 and 5 of claim 5), and column 6, change "materials" to --material--.

Column 6, in each of lines 48 and 49, change "amterial" to -- material --.